No. 843,020. PATENTED FEB. 5, 1907.
S. H. JONES & E. E. TOWLE.
CORN PLANTER.
APPLICATION FILED NOV. 30, 1906.

2 SHEETS—SHEET 1.

No. 843,020. PATENTED FEB. 5, 1907.
S. H. JONES & E. E. TOWLE.
CORN PLANTER.
APPLICATION FILED NOV. 30, 1906.

2 SHEETS—SHEET 2.

Witnesses
Inventors
Attorneys

UNITED STATES PATENT OFFICE.

SYLVESTER H. JONES AND ELMER E. TOWLE, OF RICHMOND, INDIANA, ASSIGNORS TO THE AMERICAN SEEDING MACHINE COMPANY, OF SPRINGFIELD, OHIO, A CORPORATION OF OHIO.

CORN-PLANTER.

No. 843,020.      Specification of Letters Patent.      Patented Feb. 5, 1907.

Application filed November 30, 1906. Serial No. 345,749.

*To all whom it may concern:*

Be it known that we, SYLVESTER H. JONES and ELMER E. TOWLE, citizens of the United States, residing at Richmond, in the county of Wayne and State of Indiana, have invented certain new and useful Improvements in Corn-Planters, of which the following is a specification.

This invention relates to improvements in corn-planters and feeding devices, and more particularly to that part usually designated as the "stop and start movement."

The object of the invention is to give the feed-shaft an intermittent movement from the axle of the carrying-wheel, and it is desirable to employ some form of clutch mechanism operated by the tappet-wire and automatically disengaged at the end of a predetermined movement.

The particular object is to construct a device such that the amount of force required to be exerted by the tappet-wire for throwing the clutch into engagement will be reduced to a minimum and to simplify the mechanism, rendering the parts accurate in their operations.

Figure 1:
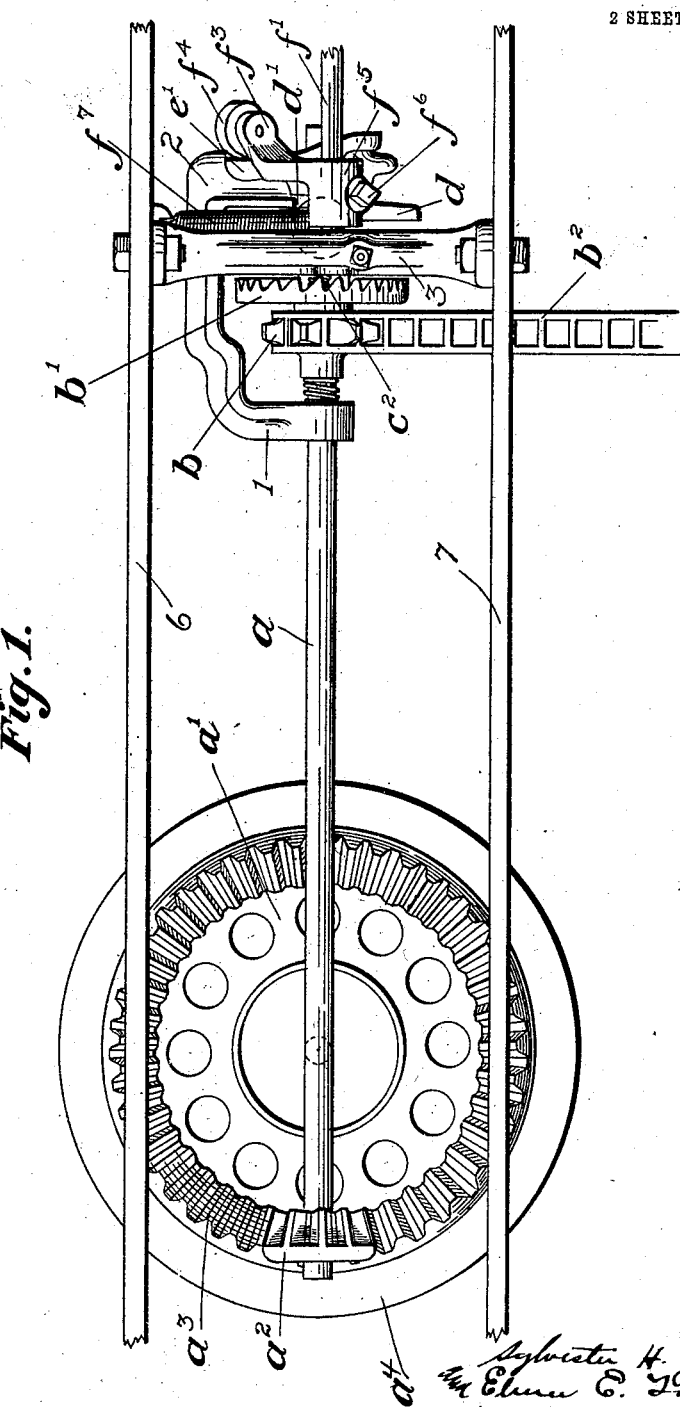
Figure 2:
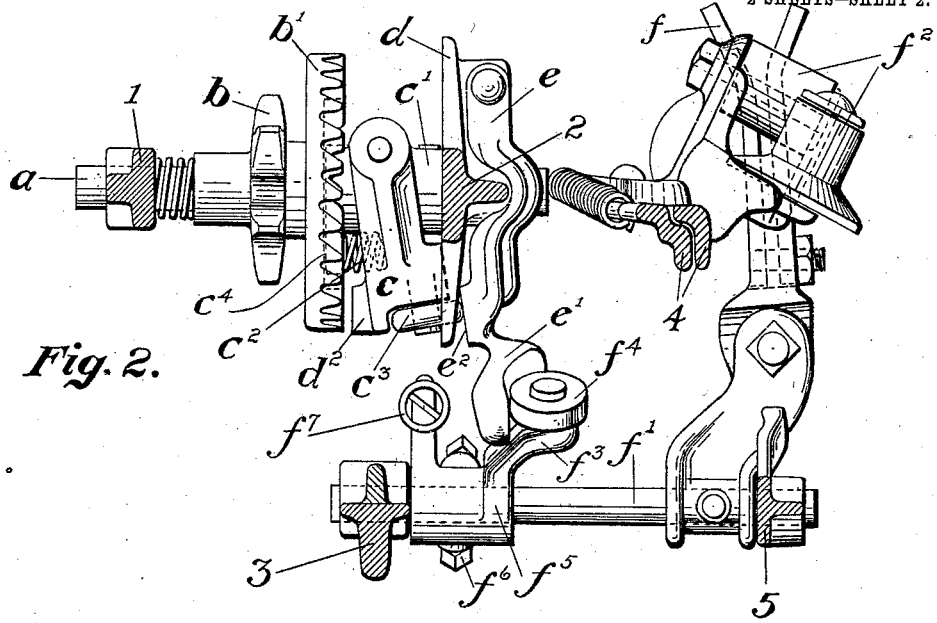
Figure 3:
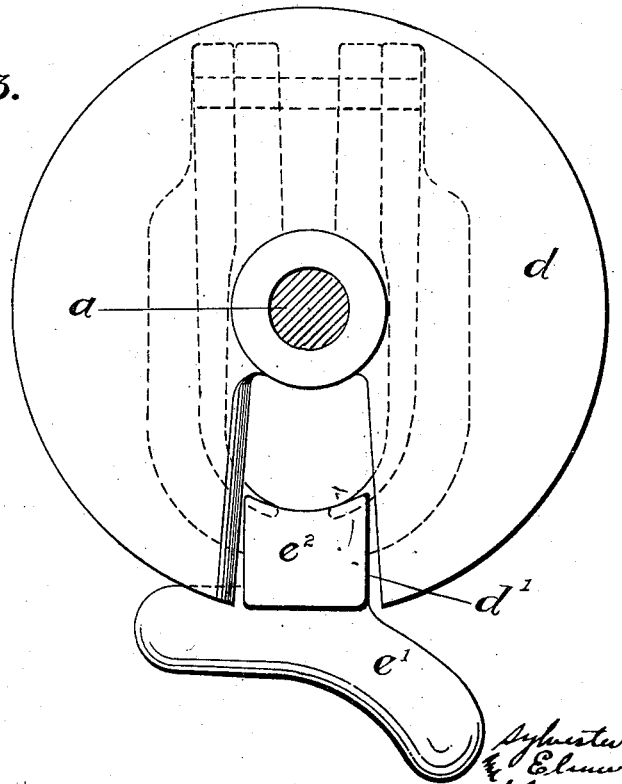

In the accompanying drawings, forming part of this specification, Figure 1 is a bottom plan view of a portion of the corn-planter, showing the improvement. Fig. 2 is a front elevation of same. Fig. 3 is a detail view of a circular track and swinging yoke, the feed-shaft being shown in section and a portion of the yoke in dotted lines.

Like parts are represented by similar characters of reference throughout the several views.

In the drawings, 1, 2, 3, 4, and 5 represent, respectively, different supporting-frame portions secured to the main frame 6 and 7. The feed-shaft $a$ is journaled loosely within the frame portions 1 and 2, and this shaft extends under the hoppers of the planter and is connected to the revolving seed-plates $a'$ of each hopper through the medium of a beveled gear $a^2$, journaled on the shaft, and the beveled gear-teeth $a^3$ on the bottom of the seed-plate disk, $a^4$ representing the bottom of one of the hoppers.

Loosely mounted on the feed-shaft is a sprocket-wheel $b$, having connected therewith a ratchet-wheel $b'$, said parts being shown integrally formed in one piece, and the same are continuously driven from the axle of the carrying-wheel (not shown) by a sprocket-chain $b^2$.

Pivotally connected to a sleeve $c'$, which is fixed to the feed-shaft, is a swinging dog $c$, normally spring-pressed away from the ratchet $b'$ by a spring $c^2$, which bears against a lug $c^4$, (shown in dotted lines,) projecting from the fixed sleeve $c'$. There is attached to said dog at the free end thereof an anti-friction-roller $c^3$, the periphery of which projects slightly beyond the main body of the dog and to the rear thereof, as indicated in Fig. 2.

Adjacent to the dog $c$ and integrally connected to the frame portion 2 is a disk $d$, the flat face of which constitutes a circular track around which the antifriction-roller $c^3$ freely moves, and this face is formed with an opening or notch $d'$, as shown in Fig. 3, sufficient in size for the roller to project therein, and thus normally occupy the position shown in Fig. 2, such that the periphery of the roller projects beyond the disk $d$ and in position to be engaged by a device for the purpose of throwing the clutch mechanism into gear. It is apparent that the ratchet $b'$ constitutes the immovable member of the clutch, while the swinging dog $c$, with its projecting tooth $d^2$, constitutes the movable member of the clutch.

The mechanism for operating the clutch through the instrumentality of the tappet-wire is as follows: Pivoted to the upper part of the disk $d$ on the face opposite from that around which the antifriction-roller revolves is a yoke $e$, carrying at its lower end a cam-surface $e'$. This yoke has a plain track $e^2$, formed on the side opposite from the cam-surface $e'$, and normally this plain surface $e^2$ engages the periphrey of the antifriction-roller $c^3$, as indicated in Fig. 2. It is apparent that when the yoke is operated the clutch mechanism will be thrown into gear, which will result in revolving the antifriction-roller $c^3$ past the notch and around the face of the disk. In the preliminary movement of the antifriction-roller $c^3$ it moves on the plain surface $e^2$ until the swinging dog $c$ is rotated a sufficient distance for the roller to engage the face $d$ of the disk. At this point the yoke may be thrown back to normal position, and the clutch members will remain in engagement until the swinging dog reaches its normal position, when the roller $c^3$ will again drop within the notch, thereby permitting the clutch members to become disconnected. As indicated in Fig. 3, the plain surface $e^2$ of the yoke $e$ conforms to the dimension of the notch $d'$, so that when the flat surface $e^2$ of the yoke $e$ is moved into line with the face of the disk $d$ for the purpose of engaging the clutch members the disk $d$ will, in effect, have a continuous track-surface. (See Fig. 2.)

$f$ represents the usual tappet-lever operated by a tappet-wire (not shown) in the usual way, being connected to a rock-shaft $f'$ in order to give said shaft a partial rotation whenever a tappet causes the movement of the tappet-lever.

$f^2$ represents the guiding-sheaves for the wire.

The shaft $f'$ has connected thereto an upwardly-projecting arm $f^3$, provided with an antifriction-roller $f^4$, normally engaging the cam-surface $e'$. The arm $f^3$ is connected to the rock-shaft through the medium of a loose sleeve $f^5$, secured to the shaft by a set-screw $f^6$, and this construction permits adjustment of the arm relative to the cam-surface $e'$. A retracting-spring $f^7$, connected to the arm on the shaft $f'$ and to a portion of the frame, serves to retract the shaft and lever after they have been operated by the wire. (See Fig. 1.) The tappet-lever is also normally spring-pressed into the position shown in Fig. 2, and a tappet on the wire forces said arm against the tension of the spring, so that when the lever in the operation of the machine passes the tappet the lever returns to normal position. It is apparent that whenever this tappet-lever oscillates the rock-shaft $f'$ also oscillates, and thereby the arm $f^3$ is oscillated, so that the antifriction-roller $f^4$ revolves freely over the cam-surface $e'$, forcing the yoke-face $e^2$ into line with the face of the disk $d$, thereby forcing the clutch mechanism into gear, and by reason of the fact that the ratchet $b'$ is a continuously-revolving clutch member the swinging dog $c$, which constitutes the movable clutch member, immediately starts to revolve, thereby revolving the seed-plate until the shaft $a$ makes a complete revolution, when the clutch members have become disengaged and the movement of the feed-plate ceases. By reason of the arrangement of the surface $e^2$ in coöperation with the notch $d'$ there is prevented any jarring of the parts, and the entire mechanism is such that the intermittent movement of the seed-plate can be brought about simply and accurately.

Having thus described our invention, we claim—

1. In a feeding mechanism for corn-planters, a continuously-revolving clutch member, an intermittently-operated clutch member, an antifriction-roller supported at the end of said last-mentioned clutch member, a disk adjacent to the clutch members, a notch formed therein, and means for projecting the friction-roller within the notch, a lever, and means for operating said lever intermittently to throw the roller out of the notch, for the purpose specified.

2. In a feeding device for corn-planters, a continuously-rotating clutch member, an intermittently-operated clutch member, a friction-roller supported thereby, a plain surface adjacent to the roller around which the roller is adapted to revolve, an operating device for said last-mentioned clutch member, a cam-face formed on said operating device, and a friction-roller adapted to engage said surface, and means for intermittently operating said last-mentioned friction-roller for the purpose of causing the engagement of the clutch members, substantially as specified.

3. In a feeding device for corn-planters, a continuously-operating clutch member, a swinging dog comprising an intermittent clutch member, an antifriction-roller on the dog, a disk having a notch formed therein, means for normally projecting the roller within the notch, a swinging operating device having a flat surface adapted to engage the roller, and means for operating said last-mentioned member and which is formed to fit within the notch in operating position, thereby forming a continuous surface on the disk, for the purpose specified.

In testimony whereof we have hereunto set our hands this 23d day of November, 1906.

SYLVESTER H. JONES.
ELMER E. TOWLE.

Witnesses:
Jos. P. Hiatt,
E. Lannes Kepler.